July 28, 1970     G. J. SUKEL     3,521,656
FLUIDIC METERING MEANS
Filed Sept. 20, 1968
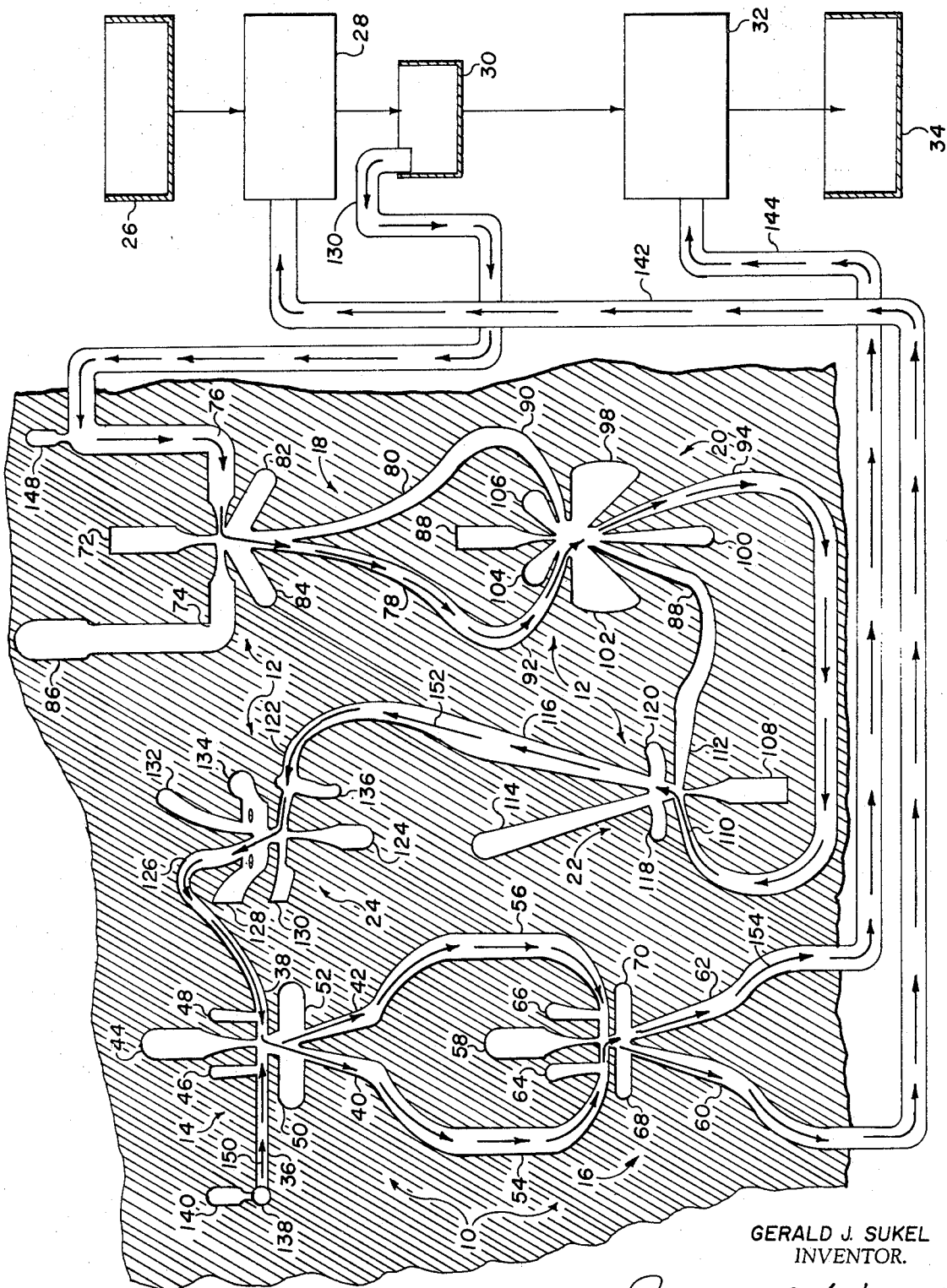
GERALD J. SUKEL
INVENTOR.
James J. Wood
Robert W. Hampton
ATTORNEYS

United States Patent Office

3,521,656
Patented July 28, 1970

1

**3,521,656
FLUIDIC METERING MEANS**
Gerald John Sukel, Albion, N.Y., assignor to Eastman Kodak Company, Rochester, N.Y., a corporation of New Jersey
Filed Sept. 20, 1968, Ser. No. 761,141
Int. Cl. F15c 1/12
U.S. Cl. 137—81.5                                  4 Claims

ABSTRACT OF THE DISCLOSURE

A fluidic metering device is disclosed for accurately metering and delivering fluids, utilizing fluidic circuitry and fluidic computer components in cooperating array.

BACKGROUND OF THE INVENTION

Field of the invention

This invention relates to fluidic metering devices utilizing fluidic circuitry and fluidic computer type components.

Description of the prior art

Although fluidics in the broad sense started much earlier, it is nevertheless generally conceded that the impetus for present development was provided in 1959 by R. E. Bowles, W. M. Horton and R. W. Warren then of the Harry Diamond Laboratories in Washington. W. M. Horton invented the stream interaction proportional amplifier, while R. E. Bowles and R. W. Warren introduced a family of devices utilizing the Coanda effect to obtain digital signals. Since that time a major effort in fluidics has been to provide many of the needs previously satiated by fairly expensive electronic systems with a view toward eliminating or minimizing some of the troublesome and costly interface problems inherent in these systems.

SUMMARY OF THE INVENTION

This invention relates to a fluidic metering means having a fluidic bistable means cooperating with analog-digital sensor means to control first and second fluidic valve means. The first fluidic valve means is arranged in fluid flow connection with a source of fluid to be metered, the opening of the first valve means permitting fluid to enter a metering tank means. The metering tank is arranged with the cooperating second fluidic valve means, the actuation of which causes the metered contents in the metering tank means to be deposited into any proper utilization means selected for the purpose at hand. A pressure sensor means is adjustably positioned within the metering tank means to develop an analog fluidic back pressure signal when the desired volumetric capacity has been reached.

The analog-digital sensor means comprises first and second control inputs and first and second outputs which provide digital OFF and ON signals respectively. A bias fluid pressure at the first control input results in digital OFF signal appearing at the first output which is vented to atmosphere. The fluidic back pressure analog signal is applied to second control input of analog-digital sensor means which results in the digital ON signal at the second output.

Fluidic bistable means having first and second control inputs and first and second outputs is adopted to receive a FILL command signal at its first control input and the digital ON signal at its second control input. Under quiescent conditions the bistable means is biased to insure a pressure signal in the second output to actuate the second fluidic valve. The signals present at the control

2 inputs of the bistable means causes it to switch outputs. The presence of a FILL command signals at the first control input produces a pressure output signal in the bistable means first output to actuate the first fluidic valve means, while the presence of the ON signal at the second control input actuates the second fluidic valve.

Accordingly, it is an object of this invention to provide a fluidic metering means which will insure an economical and trouble-free system for accurately metering predetermined volumes of fluid.

Another object of this invention is to provide lower operating costs by providing a fluidic metering means having very low power consumption with a high sensitivity to low energy signals.

Another object of this invention is to provide a fluidic metering means relatively insensitive to environmental conditions such as radiation, heat, vibration and other conditions to which nonfluidic systems are sometimes vulnerable.

The novel features of the invention are set forth with particularity in the appended claims. The invention itself, however, both as to its organization and method of operation together with objects and advantages thereof may best be understood by reference to the description to follow considered in connection with the accompanying drawings.

BRIEF DESCRIPTION OF DRAWING

The figure is a cross sectional schematic view showing the fluidic fluid metering means in accordance with the invention.

DESCRIPTION OF THE PREFERRED EMBODIMENT

The fluidic metering means in accordance with this invention comprises fluidic bistable means indicated generally at 10 and analog-digital sensor means indicated generally at 12. Conveniently the bistable means 10 and the analog-digital sensor means 12 may be fabricated from an epoxy block, with suitable cover blocks top and bottom to provide a closed pressure system with access openings for securing pressure sources and for withdrawing output pressure signals.

The fluidic bistable means 10 comprises a digital element or flip flop indicated at 14, and a digital element functioning as an amplifier indicated at 16.

The analog-digital sensor means 12 here includes: first and second analog or proportional amplifiers indicated at 18 and 20 respectively, a digital element or flip flop indicated at 22, and a power amplifier indicated at 24.

A source of fluid to be metered is indicated at 26. A first fluidic valve means 28 is arranged in fluid flow connection between the fluid source 26 and metering tank means 30. A second fluid valve means 32 is arranged in fluid flow connection between the metering tank means 30 and any suitable utilization means 34.

The flip flop or digital element 14 comprises control inputs indicated at 36, 38, and output conduits at 40, 42. The power source for the flip flop 14 is supplied at power nozzle 44; the digital element 14 is vented at 46, 48, 50 and 52.

The output conduits 40, 42 of digital element 14 are connected to the control inputs 54, 56 of digital amplifier 16. The digital amplifier 16 is supplied with power through the power nozzle at 58, and includes output conduits indicated at 60, 62. The digital amplifier 16 is vented at 64, 66, 68 and 70.

The first analog or proportional amplifier 18 is energized through a power nozzle indicated at 72. Control input conduits are indicated at 74, 76, and output conduits at 78, 80. The proportional amplifier 18 is vented at 82 and 84. A bias pressure source is connected to the amplifier 18 at bias power nozzle 86.

The second analog or proportional amplifier 20 includes a power nozzle 88, control conduits 90, 92 and output conduits 94 and 96. The proportional amplifier 20 is vented at 98, 100, 102, 104 and 106; because of the vents the proportional amplifier 20 is insensitive to loading effects.

The digital element or flip flop 22 comprises power nozzle 108, control passages 110, 112 and output conduits 114, 116. The flip flop 22 is vented at 118, 120.

The output 116 of flip flop 22 is connected to input 122 of power amplifier 24. Power input source for the power amplifier 24 is applied at power nozzle 124. The output conduit for the power amplifier 24 is indicated at 126 which is connected to the control input 38 of the flip flop 14. The power amplifier 24 is vented at 128, 130, 132, 134 and 136.

Completing the description, a FILL command sensor 138 supplied by power nozzle 140 is connected to the control input 36 of digital element 14.

The output conduit 60 of digital amplifier 16 is connected to the first fluidic valve 28 by means of any suitable fluidic connection such as tubing 142; similarly, output conduit 62 is connected by any suitable fluidic connection such as tubing 144 to the second fluidic valve 32.

A pressure sensor means indicated generally at 146, and here illustrated as a simple tubing element, is connected to the control input 76 of the first analog or proportional amplifier 18. A biasing pressure is also supplied to control input 76 through power nozzle 148.

OPERATION OF THE DEVICE

In one practical embodiment of the fluidic metering means of the invention, the magnitudes of the power sources for the various components were as follows:

| Component: | Pressure at power nozzle (p.s.i.) |
|---|---|
| Digital bistable element 14 | 10 |
| Digital amplifier 16 | 10 |
| First proportional amplifier 18 | 1 |
| Second proportional amplifier 20 | 1 |
| Digital bistable element 22 | 3 |
| Power amplifier 24 | 6 |

QUIESCENT OPERATION

Before considering the dynamic aspects of the invention, it will be helpful to briefly consider the quiescent status of each of the components of the fluidic metering means of the instant invention.

By means of the bias pressure at nozzle 86, the proportional amplifier 18 is pressure biased at control input 74 so that it has a fluid flow through output conduit 80. The output conduit at 80 is connected in fluid flow connection with the control input 90 of the proportional amplifier 20, so that there is fluid flow in output conduit 96. The fluid stream in output conduit 96 is applied to control input 112 of the flip flop 22, causing the flip flop, to have fluid flow in output conduit 114, which is vented to the atmosphere.

Power amplifier 24 then receives no input from flip flop 22 under quiescent conditions, and the pressure stream through power nozzle 124 appears in output conduit 132 which is vented to atmosphere; this defines a digital OFF signal for the analog digital sensor means 12.

The digital element 14 is biased slightly by reason of its geometry, so that it has a fluid flow in output passage 40 after power is applied at nozzle 44 and no signals have been received at control inputs 36 or 38. The jet stream flow in output passage 40 is the input to control input 54 of digital amplifier 16, causing fluid flow in output passage 62.

The fluid stream in output passage 62 through tubing 144 is connected to the second fluidic actuated valve 32, so that this valve is open; however, as will be seen when dynamic operation is explained, the fluidically actuated valves 28 and 32 are never both open at the same time, and although valve 32 is now open, it is of no consequence because there is nothing in the metering tank means 30 at this time.

DYNAMIC OPERATION

When it has been determined that additional fluid is required, a FILL command signal is sent to the metering means. As illustrated in FIG. 1, the FILL command signal is provided by fill sensor 138 which sends a fluid stream indicated at 150, to the digital element 14; this causes the fluidic bistable means 10 to switch. An output pressure stream appears in output conduit 42 which is then applied to the control input 56 of the digital amplifier 16 switching the pressure stream from output conduit 62 to output conduit 60. The resulting pressure in tubing 142 opens the first fluidic valve means 28, and since the pressure in output passage 62 is very low or substantially zero, fluidic valve means 32 closes.

The fluidic source now freely flows from fluid source 26 through the fluidic valve 28 to the metering tank means 30. When the fluid in tank 30 reaches the height defined by the end of the pressure sensor means 146, the resulting back pressure is sent through the tubing to control input 76 of the proportional amplifier 18, causing a jet flow to appear in output passage 78, and ultimately causes a fluid flow in output passage 94 of proportional amplifier 20.

The output of proportional amplifier 20 is applied to the flip flop 22, causing it to switch from the venting output passage 114 to output passage 116 sending an output stream as indicated at 152 into the power amplifier 24. This fluid stream at control input 122 switches the power stream issuing through power nozzle 124 into output conduit 126. The resulting fluid stream applied through the control conduit 38 causes the flip flop 14 to switch to output passage 40, and as may be seen by tracing the arrows identified at 154, this results in a fluid output through the output conduit 62, actuating the second fluidic valve 32, and closing the first fluidic valve 28. The metered or measured contents of the tank 30 is then dumped into any suitable utilization means 34.

The invention has been described in detail with particular reference to a preferred embodiment thereof, but it will be understood that variations and modifications can be effected within the spirit and scope of the invention as described hereinabove and as defined in the appended claims.

I claim:

1. Fluidic metering means for accurately measuring a volume of fluid supplied from a fluid source to a utilization means in response to a fill command signal, comprising:
   (a) metering tank means;
   (b) first fluidic valve means in fluid flow connection with said fluid source, and with said metering tank means, and actuatable to establish a flow of fluid from said fluid source into said metering tank means;
   (c) second fluidic valve means in fluid flow connection with said metering tank means and with said utilization means, and actuatable to establish a flow of fluid from said metering tank means into said utilization means;
   (d) level sensing means positioned in said metering tank means to derive an analog fluidic back pressure signal when the fluid within said metering tank means reaches a predetermined volume;
   (e) fluidic analog-digital sensor means having first and second inputs and first and second digital outputs, said first input being biased so as to produce a first digital fluidic signal in said first output, said second input being connected to said level sensing means to receive said analog fluidic back pressure, and to produce a second digital fluidic output signal in said second output; and (f) fluidic bistable means having first and second control inputs, and first and second output conduits, said first control input being connected to receive said fill command signal and to switch said fluidic bistable means to provide a fifth fluidic signal in said first output conduit, said second control input being connected to said second digital output of said analog-digital sensor means to provide a sixth fluidic signal in said second output conduit, said first output conduit being connected to said first fluidic valve means, said first fluidic valve means and said second fluidic valve means being responsive successively to said fifth and sixth fluidic signals.

2. Fluidic metering means according to claim 1 wherein
(e) 1 said fluidic analog-digital sensor means comprises first and second proportional fluidic amplifier means, fluidic bistable means, and fluidic power amplifier means connected in cascade respectively, said first proportional fluidic amplifier means providing said first and second inputs, said fluidic power amplifier means providing said first and second digital outputs.

3. Fluidic metering means according to claim 1 wherein
(f) 1 said fluidic bistable means comprises first and second fluidic digital elements connected in tandem in fluid flow array, said first fluidic element providing said first and second control inputs, said second fluidic element providing said first and second output conduits.

4. Fluidic metering means for accurately measuring a volume of fluid supplied from a fluid source to a utilization means in response to a fill command signal, comprising:

(a) metering tank means;
(b) first fluidic valve means in fluid flow connection with said fluid source and with said metering tank means, and actuatable to establish a flow of fluid from said fluid source into said metering tank means;
(c) second fluidic valve means in fluid flow connection with said metering tank means and with said utilization means and actuatable to establish a flow of fluid from said metering tank means into said utilization means;
(d) level sensing means positioned in said metering tank means to derive an analog fluidic back pressure signal when the fluid within said metering tank means reaches a predetermined volume;
(e) fluidic analog-digital sensor means comprising first and second proportional fluidic amplifier means, fluidic bistable means, and fluidic power amplifier means connected in cascade respectively, said first proportional fluidic amplifier means providing said first and second inputs for said analog-digital sensor means, said fluidic power amplifier means providing said first and second digital outputs for said analog-digital sensor means, said first input being so biased so as to produce a first digital fluidic signal in said first output, said second input being connected to said level sensing means to receive said analog fluidic back pressure, and to proudce a second digital fluidic output signal in said second output;
(f) fluidic bistable means comprising first and second fluidic digital elements connected in tandem in fluid flow array, said first fluidic element providing first and second control inputs for said bistable means, said second fluidic element providing first and second output conduits for said fluidic bistable means, said first control input being connected to receive said fill command signal and to switch said fluid bistable means to provide a fifth fluidic signal in said first output conduit, said second control input being connected to said second digital output of said analog-digital sensor means to provide a sixth fluidic signal in said second output conduit, said first output conduit being connected to said first fluidic valve means, said second output conduit being connected to said second fluidic means, said first valve means and said second fluidic valve means being responsive successively to said fifth and sixth fluidic signals.

References Cited
UNITED STATES PATENTS

| | | | |
|---|---|---|---|
| 3,277,914 | 10/1966 | Manion | 137—81.5 XR |
| 3,429,248 | 2/1969 | Furlong | 137—81.5 XR |
| 3,443,692 | 5/1969 | Halsey | 137—454 XR |
| 3,463,178 | 8/1969 | Kirchmier | 137—81.5 |
| 3,467,122 | 9/1969 | Jones | 137—81.5 |

SAMUEL SCOTT, Primary Examiner

U.S. Cl. X.R.

137—393

PO-1050
(5/69)

UNITED STATES PATENT OFFICE
CERTIFICATE OF CORRECTION

Patent No. 3,521,656      Dated September 23, 1970

Inventor(s) Gerald J. SUKEL

It is certified that error appears in the above-identified patent and that said Letters Patent are hereby corrected as shown below:

Col. 5, line 13, After "means," --said second output conduit being connected to said second fluidic means,-- should have been inserted.

Col. 6, line 11, After "being" --so-- should be deleted.

Col. 6, line 14, Change "proudce" to --produce--.

SIGNED AND
SEALED
NOV 17 1970

(SEAL)
Attest:

Edward M. Fletcher, Jr.
Attesting Officer

WILLIAM E. SCHUYLER, JR.
Commissioner of Patents